Patented Nov. 6, 1923.

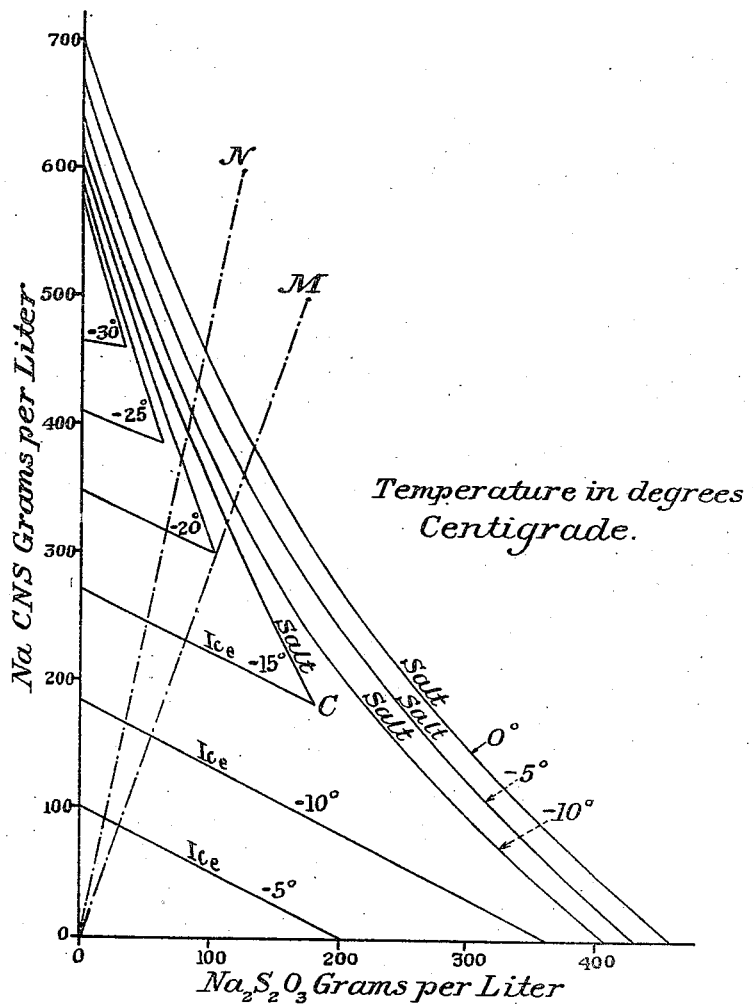

1,473,327

UNITED STATES PATENT OFFICE.

FREDERICK WILLIAM SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

ANTIFREEZE COMPOSITION.

Application filed December 7, 1921. Serial No. 520,520.

*To all whom it may concern:*

Be it known that I, FREDERICK WILLIAM SPERR, Jr., a citizen of the United States, and a resident of Pittsburgh, in the county of Allegheny, State of Pennsylvania, have invented certain new and useful Improvements in Antifreeze Compositions, of which the following is a full, clear, and exact description, such as will enable others skilled in the art to which it appertains to make and use the same.

My invention relates to a substance which when added to a liquid reduces the freezing point of the mixture, as, for example, where it is desired to protect an automobile radiator from freezing.

The object of my invention is to provide a composition of the character described which will be economical to manufacture and which will serve to reduce the freezing point, particularly of water, and at the same time be harmless as regards its effect on various materials, such as iron, steel, brass, solder, copper, tin, zinc, lead, aluminum, rubber, cotton, etc. A further object of my invention is to produce an anti-freeze composition in a concentrated form which can be cheaply transported, is conveniently handled, is not inflammable, and does not evaporate, decompose, or otherwise deteriorate when stored, heated, cooled, or subjected to other actions.

Ordinary anti-freeze compositions for use in automobile radiators, such as alcohol, are not only costly, but evaporate when in use. It is difficult to tell when all the alcohol is evaporated and how much more alcohol should be added to the radiator. It often happens that all the alcohol evaporates without the knowledge of the chauffeur, causing bursting of radiator tubes on later exposure to the cold. Glycerine and mixtures of glycerine and alcohol have been used to some extent for anti-freeze compositions but are costly and attack rubber parts. Salt solutions have been used such as NaCl, $CaCl_2$, etc., but difficulties result from corrosion of metal parts. Oils, such as kerosene, are unsatisfactory for this purpose, due to the fact that all moisture must be removed from the radiator tubes before addition, otherwise the water and oil will not mix and the entrapped water is apt to freeze, bursting the tubes. Other disadvantages in the use of kerosene lie in its expense and fire hazard, as it will leak out of very small crevices which would ordinarily retain an aqueous mixture. The low specific heat of kerosene causes inefficient engine operation and overheating, which is not only detrimental to engine parts, but a nuisance in breaking the thermometers in motometers.

I have found that sodium thiocyanate, NaSCN, reduces the freezing point of water and overcomes the above difficulties. I prefer to use sodium thiocyanate in a mixture containing sodium thiosulphate, $Na_2S_2O_3$. This mixture is obtained as a mother liquor from the scrubbing of artificial gas with an alkaline solution during the gas purification. The liquor usually contains a small amount of sodium carbonate which contributes a certain beneficial quality when used in connection with automobile radiators or other apparatus having metal parts.

The accompanying drawing is a diagram illustrating the freezing characteristics of such a solution. In the diagram the concentration of the sodium thiocyanate in grams per liter is indicated as ordinates and the concentration in grams per liter of the sodium thiosulphate is indicated as abscissæ. On this diagram appear the curves indicating the concentration of the salts to produce a solution having the freezing point designated on such curves in degrees centigrade. For example, a concentration of sodium thiocyanate alone between 270 grams per liter and 615 grams per liter will not freeze at $-15°$ C. If the concentration is reduced below 270 grams per liter, ice will start to separate at $-15°$ C. If the concentration is increased above 615 grams per liter, the salt will start to separate at $-15°$ C. Between these two concentrations there is no danger of freezing or separation of ice or salt from the solution.

The curve designated $-15°$ shows the concentrations of the mixture of sodium thiocyanate and sodium thiosulphate at which salt and ice will begin to separate at this temperature. This curve has two branches, one marked salt, and the other, ice, which have the junction point C which is the cryohydric point.

Similarly the other temperature curves indicate the concentrations at which ice and salt will begin to separate from the solution.

The concentrations of a solution carrying a known proportion of sodium thiocyanate and sodium thiosulphate which will not freeze at a certain temperature may be readily determined from this diagram and hence the dilution which is permissible without danger of freezing or salt separation may be ascertained.

The following are two examples:

Assume the solution contains 500 grams per liter of sodium thiocyanate and 175 grams per liter of sodium thiosulphate. Locate the point M representing the above concentration and draw a line MO passing through the point M and the point of origin O. Any concentration represented by a point on this line and lying within the field bordered by the —15° curve will not separate ice or salts at temperatures down to —15° C.

Assume the solution contains 600 grams per liter of sodium thiocyanate and 125 grams per liter of sodium thiosulphate. Locate the point N representing the above concentration and draw a line NO passing through the point N and the point of origin O. Any concentration represented by a point on this line and lying within the field bordered by the —15° curve will not separate ice or salts at temperatures down to —15° C. and similarly for points on this line and lying within the fields bordered by the other temperature curves.

It will be particularly noted that the second example shows a greater temperature range, the line NO cutting the area bounded by the —20° curve. This indicates the desirability of having the concentration of the sodium thiocyanate large in comparison to that of the sodium thiosulphate.

The branches of the curves marked ice and salt respectively indicate the degree of concentration at which ice and salt will separate at the specified temperature without supersaturation. The actual separation, however, does not occur until there is some supercooling. In the case of the ice crystallization the supercooling is slight, while in the case of salt separation the supersaturation becomes quite pronounced before salt crystallization commences even if the solution is agitated.

Solutions containing a high percentage of NaSCN and mixtures of NaSCN and $Na_2S_2O_3$ can be inexpensively obtained as a by-product from certain gas purification processes. For instance in the removal of sulphur from gas, the gas is brought into contact with an alkaline solution which is continuously circulated and aerated. The alkaline solution usually consists of sodium carbonate. The sulphur in the gas which is in the form of hydrogen sulphite, $H_2S$, reacts with the sodium carbonate, $Na_2CO_3$, to form sodium bicarbonate, $NaHCO_3$, and sodium hydrosulphide, NaHS. The sodium carbonate also reacts with carbon dioxide, $CO_2$, which is present in the gas, to form the bicarbonate. When the resulting solution containing sodium bicarbonate and sodium hydrosulphide, together with unchanged sodium carbonate, is aerated, part of the sodium hydrosulphide is changed to sodium thiosulphate, $Na_2S_2O_3$. The remainder is decomposed back to sodium carbonate, water, carbon dioxide and hydrogen sulphide. The regenerated solution of sodium carbonate is then used for further gas treatment. In addition to the hydrogen sulphide and carbon dioxide in the gas, there is present some cyanogen or hydrocyanic acid, HCN, which reacts to form sodium thiocyanate, NaSCN. In the above process of gas purification there is an accumulation, in the regenerated liquor, of sodium thiosulphate and sodium thiocyanate. Periodically this liquor is evaporated so as to crystallize out the sodium carbonate which is again dissolved and used in the process. This crystallization is best conducted hot. The mother liquor from this operation consists of a mixture of sodium thiosulphate, sodium thiocyanate, a small amount of sodium carbonate and certain impurities which may impart a dark color. The sodium thiosulphate can be separated in a comparatively pure form from this mother liquor by a cold crystallization, leaving a second mother liquor rich in sodium thiocyanate and containing some sodium thiosulphate, together with a relatively small amount of sodium carbonate or bicarbonate. This second mother liquor is especially suitable for use as an anti-freeze compound. If desired, it can be concentrated, and then added in a concentrated form to automobile radiators.

It will be noted from the above description that the mother liquor contains a small proportion of sodium carbonate or bicarbonate. This imparts a slight alkalinity to the liquor, which is beneficial in an antifreeze compound for use in connection with automobile radiators.

As shown by the diagram it is possible to vary the proportions of sodium thiocyanate and sodium thiosulphate between wide limits, depending on the lowering of the freezing point which is desired.

The invention is not limited to any particular ratio of the two salts or their concentration in liquid solution. Neither is the invention limited to the use of these ingredients alone in the anti-freeze composition as the ingredients may be mixed with other substances, if desired. Neither is the invention limited to the particular process of gas purification in which the anti-freeze mother liquor is obtained. While the anti-freeze composition has been mentioned as for use in automobile radiators it may be used for other anti-freeze purposes, for example, for making brines for refrigerating purposes. While the anti-freeze composition preferably contains the sodium salts, since it is recovered in this form from the gas purification process which is a cheap source of material, other salts may be used, for example, other alkali-metal or alkaline-earth metal salts, such as those of potassium, calcium, etc., or any other soluble thiocyanates and thiosulphates. It is to be understood therefore that the present invention is not limited to its illustrated embodiment, but it may be otherwise embodied within the scope of the following claims.

I claim:

1. An anti-freeze composition containing a soluble thiocyanate and a soluble thiosulphate, substantially as described.

2. An anti-freeze composition containing an alkali-metal thiocyanate and an alkali-metal thiosulphate, substantially as described.

3. An anti-freeze composition containing sodium thiocyanate and sodium thiosulphate, substantially as described.

4. An anti-freeze composition containing a thiocyanate and a soluble non-volatile alkaline substance, substantially as described.

5. An anti-freeze composition containing an alkali-metal thiocyanate, an alkali-metal thiosulphate and a relatively small amount of a soluble non-volatile alkaline substance, substantially as described.

6. An anti-freeze composition containing sodium thiocyanate, sodium thiosulphate, and a sodium carbonate, substantially as described.

7. An anti-freeze composition containing a thiocyanate and a thiosulphate recovered from gas purification, substantially as described.

8. An anti-freeze composition derived from the mother liquor obtained from scrubbing gas with an alkaline solution, substantially as described.

9. An anti-freezing aqueous solution containing a thiocyanate and a thiosulphate, substantially as described.

10. An anti-freezing aqueous solution containing sodium thiocyanate and sodium thiosulphate, substantially as described.

11. The process of reducing the freezing point of water or an aqueous solution, which consists in mixing therewith an alkali metal thiocyanate and an alkali metal thiosulphate, substantially as described.

12. The process of reducing the freezing point of water or an aqueous solution, which consists in mixing therewith sodium thiocyanate and sodium thiosulphate, substantially as described.

13. The process of reducing the freezing point of water or an aqueous solution, which consists in mixing therewith sodium thiocyanate, sodium thiosulphate and sodium carbonate, substantially as described.

In testimony whereof I have hereunto set my hand.

FREDERICK WILLIAM SPERR, Jr.